United States Patent

O

[11] Patent Number: 6,014,807
[45] Date of Patent: Jan. 18, 2000

[54] METHOD OF MANUFACTURING A DOUBLE-STRUCTURE SYNCHRONIZER RING

[75] Inventor: Jung Sok O, Seoul, Rep. of Korea

[73] Assignee: Hyundai Motor Company, Seoul, Rep. of Korea

[21] Appl. No.: 08/878,099

[22] Filed: Jun. 18, 1997

[30] Foreign Application Priority Data

Jun. 18, 1996 [KR] Rep. of Korea ........................ 96-26765

[51] Int. Cl.⁷ ................................................. B21D 53/28
[52] U.S. Cl. .................................. 29/893.37; 192/107 M
[58] Field of Search ..................... 29/893.37; 192/107 M, 192/53.34

[56] References Cited

U.S. PATENT DOCUMENTS

| | | | |
|---|---|---|---|
| 4,917,743 | 4/1990 | Gramberger et al. | 192/107 M |
| 4,931,117 | 6/1990 | Müller | 192/107 M |
| 5,370,725 | 12/1994 | Kawamura et al. | 192/107 M |
| 5,433,774 | 7/1995 | Kapl et al. | 106/36 |

*Primary Examiner*—P. W. Echols
*Attorney, Agent, or Firm*—Finnegan, Henderson, Farabow, Garrett & Dunner, L.L.P.

[57] ABSTRACT

This invention relates to a double-synchronizer ring and its manufacturing method. More particularly, this invention relates further to a novel type of the double-structure synchronizer ring and its manufacturing method using raw material powder which is press molded and sintered for the embodiment of the synchronizer ring thereof. The synchronizer ring according to this invention is constructed in such a manner to separate an inter-diameter indentation portion comprising copper powder sintering agent and an external ring body portion comprising sintering metal and then, to indent the inter-diameter indentation portion into an inter-diameter of the external ring body portion, so as to embody an integrated form of the synchronizer ring. Thus, the synchronizer ring according to this invention has a better friction force and cost-saving benefits than the conventional one.

11 Claims, 1 Drawing Sheet

METHOD OF MANUFACTURING A DOUBLE-STRUCTURE SYNCHRONIZER RING

BACKGROUND OF THE INVENTION

1. Field of the Invention

This invention relates to a double-structure synchronizer ring and its manufacturing method. More particularly, this invention relates to a novel type of double-structure synchronizer ring and its manufacturing method using raw material powder which is press molded and sintered. The synchronizer ring according to this invention is constructed in such a manner as to separate into an inter-diameter indentation portion comprising copper powder sintering agent and an external ring body portion comprising sintering metal and then, to indent the inter-diameter indentation portion into an inter-diameter of the external ring body portion, so as to embody an integrated form of the synchronizer ring. The synchronizer ring according to this invention has a better friction force and cost-saving benefits.

2. Background of the Related Art

A synchronous ring plays a frictional role between two gears in order to impart the same relative velocity between gears having different velocities in hand transmission gears boxes of automobiles.

As illustrated in FIG. 1, the conventional synchronizer ring has a single structure and in particular, its ring body portion comprises a brass forging agent containing copper as a main ingredient, and other materials, such as, aluminum, manganese, silicon, iron, chromium, nickel, lead and zinc.

According to a process for manufacturing a conventional synchronizer ring containing a brass forging agent, a common type of the synchronizer ring contains 59–65 weight % of copper, 1.7–3.7 weight % of aluminum, 2.2–3.8 weight % of manganese, 0.5–1.3 weight % of silicon, less than 0.6 weight % of iron, 0.07–0.27 weight % of chromium, 0.2–0.6 weight % of nickel, less than 0.18 weight % of lead and the remaining amount comprising zinc. A conventional synchronizer ring is prepared in a forged molding process, such as a continuous casting method or an extrusion method. The continuous casting method involves dissolving the ingredients into a mixture, delivering the mixture in liquid metal form, and continuous casting, cutting and processing operations. On the other hand, the extrusion method involves dissolving the ingredients, billet fabrication (SEMI continuous casting), cutting, line-up, hot extrusion, lineal alignment, and other suitable processing operations.

However, since a synchronizer ring is inserted into a synchronizer hub (not illustrated) to perform sliding movement toward axial direction, conventional ring materials tend to be expensive and wear easily.

SUMMARY OF THE INVENTION

The present invention is intended to overcome the prior art problems such as abrasiveness of a synchronizer ring material and its high cost.

It is therefore an object of the invention to provide a novel type of the synchronizer ring having a better abrasion-resisting property based on inexpensive materials and its manufacturing method. According to this exemplary aspect, the synchronizer ring is constructed in such a manner that its external ring body portion contains a sintering metal that comprises a press-molded iron-based raw material powder, while the inter-diameter indentation portion contains a coating-sintered double material that includes a copper powder that is provided on a steel sheet.

The double-structure synchronizer ring assembled in an automobile gear box according to another exemplary aspect of the invention is constructed in an integrated form, wherein it divides into an external ring body portion of iron-based sintering metal and an inter-diameter indentation portion where a copper powder is coated and sintered and then, a junction jaw, formed in the outside of the inter-diameter indentation portion, is inserted and indented to a junction hole, formed in the inside of the external ring body portion.

In an additional aspect of the invention, the synchronizer ring assembled in an automobile gear is constructed in an integrated form, wherein an iron-based sintering metal material powder is press molded and sintered to prepare an external ring body portion; a copper powder is sprayed to the external ring body portion on a cold-indented steel sheet, sintered and press-molded to prepare an inter-diameter indentation portion; then, inserting the inter-diameter indentation portion into the inter-diameter of the external ring body portion.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention are incorporated in and constitute a part of this specification. The drawings illustrate embodiments of the invention and, together with the description, serve to explain the principles of the invention. In the drawings.

DETAILED DESCRIPTION OF THE INVENTION

Reference will not be made in detail to the present preferred embodiments of the invention illustrated in the accompanying drawings. Wherever possible, the same reference numbers are used throughout the drawings to refer to the same or like parts.

Figure 1:
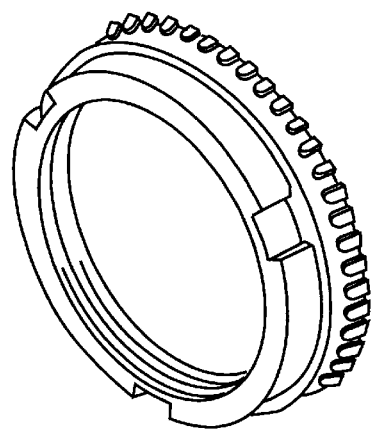
FIG. 1 is a perspective view showing a conventional synchronizer ring structure.
Figure 2:
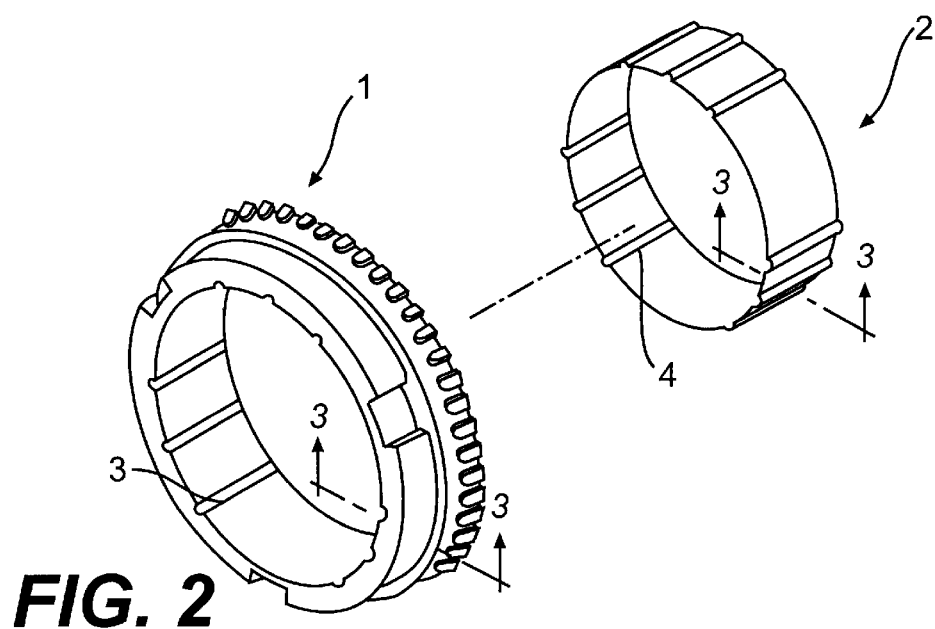
FIG. 2 is a separated perspective view showing a double-structure synchronizer ring according to this invention.

As illustrated in FIG. 2, the synchronizer ring according to this invention, having the same general shape of the conventional one, is characterized in that the inter-diameter portion of a external ring body portion 1 is constructed in such a manner to separate into an individual inter-diameter indentation portion 2. The external ring body portion 1 comprises a sintering metal formed by sintering the material powder containing iron as a main ingredient. Moreover, the inter-diameter indentation portion 2 comprises a copper powder sintering agent that includes a copper powder that is coated and sintered on a cold rolled sheet.

As also shown in FIG. 2, the inter-diameter indentation portion 2 includes a junction jaw 4 for being inserted and indented into a junction hole 3 of the external ring body portion 1. As such, an integrated structure is formed when the inter-diameter indentation portion 2 is placed within the external ring body portion 1.

This invention is further characterized in that, unlike the prior art, the inter-diameter portion, as a result of a serious abrasion that may have occurred in the process of using a synchronizer ring, is replaced by a copper powder sintering agent to improve the frictional force to a great extent.

The manufacturing procedure of a double-structure synchronizer ring formed according to this invention may be explained as follows:

The external ring body portion 1 of this invention is an iron-based sintering metal containing iron as a main ingredient. To the total composition, there is provided a premixed material powder comprising 0.3–0.6 weight % of carbon, 1.0–3.0 weight % of copper, 1.0–5.0 weight % of nickel, 0.3–0.8 weight % of molybdenum and the remaining amount comprising iron. The above material power is filled to a metal mold corresponding to the external ring body portion forming a synchronizer ring. Then, the press molding process at 6–7 ton/cm$^2$ is performed to prepare a molding product whose density is 6.8–7.0 kg/cm$^3$. Under the reductive flow at 1140±20° C. (i.e., under the flow of decomposed ammonia gas), the molding product is sintered for 30 minutes to 1 hour to prepare the external ring body portion 1. Hence, the outside of the external ring body portion 1 has the same shape of the synchronizer ring as the conventional ring and a plurality of junction holes 3 formed to an inter-diameter side for an efficient indentation, when the inter-diameter indentation portion 2 is indented.

In the meantime, an inter-diameter indentation portion 2 according to this invention is prepared in a thin shape of a ring. The ring shape of the inter-diameter indentation portion 2 is prepared in such a manner that a copper powder is homogeneously sprayed in a thickness of 0.5–1.0 mm on a cold rolled sheet (e.g., spcc, 0.2–0.5 ton) and under reductive flow (e.g., under the flow of decomposed ammonia gas), is sintered at 800±20° C. for 15 to 30 minutes. After employing the sintering, cutting and press-molding processes, the inter-diameter indentation portion 2 forming a junction jaw 4 is prepared.

The external ring body portion 1 and inter-diameter portion 2 are formed so as to have the shapes illustrated in FIG. 2. The junction jaw 4 of the inter-diameter indentation portion 2 is inserted and indented to a plurality of junction holes 3 formed in inter-diameter side of an external ring body portion 1. Hence, the indentation should be made so as to have the indentation allowance by +0.1–+0.3 and then, an integrated synchronizer ring may be prepared.

Figure 3:
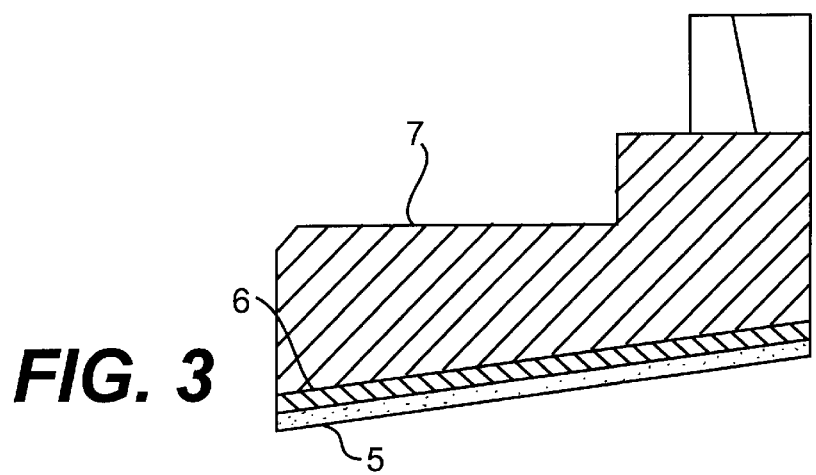
FIG. 3 is a cross-sectional view of the combined double-structure synchronizer ring taken in the line 3—3 of FIG. 2.

As illustrated in FIG. 3, a cross-sectional structure of the synchronizer ring prepared by this invention comprises a double complex structure, wherein a copper powder sintering agent 5 is applied to an inter-diameter portion so as to demonstrate the frictional force and a steel sheet 6, being adjacent to the copper powder sintering agent 5, is indented to an adjoining sintering metal 7, forming the whole body. In one respect, the synchronizer ring according to this invention uses an iron-based sintering metal 7 as a main ingredient because it is cheaper than the conventional brass forging agent. In another respect, a copper powder sintering agent 5 is applied to the inter-diameter side for improving a frictional force.

Therefore, the synchronizer ring according to this invention may be prepared with more reasonable cost than the conventional brass forging agents, thus greatly reducing the production cost while significantly improving the inter-diameter frictional force. In fact, the friction abrasion tests showed that the synchronizer ring according to this invention has a mean friction coefficient value of 0.13$\mu$ that constitutes about a 45% improvement over the conventional one which has a mean friction coefficient value of 0.09$\mu$.

As described in the above, the synchronizer ring according to this invention is different from the conventional one in terms of raw materials but is also constructed in such a manner so as to have double structures for providing the effective friction force. Thus, it is expected that the synchronizer ring according to this invention may be effectively used in the industry, since it has a better friction force and abrasion-resisting properties as well as cost-saving effects.

The process for manufacturing the synchronizer ring according to this invention is explained in more detail as set forth hereunder based upon the following Examples.

EXAMPLE 1

In example 1, a process of manufacturing an external ring body portion 1 is illustrated. In this exemplary process, 2,000 g of the premixed material powder containing 93.9 weight % of iron, 0.5 weight % of carbon, 2.0 weight % of copper, 3.0 weight % of nickel and 0.6 weight % of molybdenum was prepared for a sintering metal. Then, the sintering metal was filled into a metal mold of SKD 11 size and press molded at the pressure of 7 ton/cm$^2$.

Hence, the molding density was 6.9 g/cm$^3$. Under the flow of decomposed ammonia gas, the molded product was sintered at a common type of continuous furnace at the temperature of 1150° C. for 40 minutes to prepare the external ring body portion of the synchronizer ring.

EXAMPLE 2

In example 2, a process of manufacturing an inter-diameter indentation portion 2 is illustrated. In this exemplary process, a copper powder was homogeneously sprayed on a cold rolled sheet (spcc, 0.4 ton) in a thickness of 0.8 mm and under the flow of decomposed ammonia gas, was sintered at 815° C. for 20 minutes.

A steel sheet coated with a copper sintering agent was cut by a cold rolling agent (SPCC) so as to prepare a molded inter-diameter indentation synchronizer ring where 9 junction jaws from a common type of oil-hydraulic press protrude to the outside (the corresponding holes formed in the inter-diameter portion).

EXAMPLE 3

In example 3, a process of manufacturing an integrated synchronizer ring is illustrated. In this exemplary process, the inter-diameter indentation portion ring, so prepared from the Example 2, was forcibly indented (indentation allowance+0.2) to the external ring body portion, so prepared from the Example 1 and then, an integrated form of the synchronizer ring was completely prepared.

COMPARATIVE EXAMPLE

As a comparative example, a process of manufacturing a conventional synchronizer is illustrated. According to this process, the brass forging agent, comprising 62 weight % of copper, 2.0 weight % of aluminum, 3.2 weight % of manganese, 1.0 weight % of silicon, less than 0.3 weight % of iron, 0.15 weight % of chromium, 0.5 weight % of nickel, 0.1 weight % of lead and 30.75 weight % of zinc, was prepared.

Then, by the common method of continuous casting to dissolve the ingredients, delivery in liquid metal, continuous casting, cutting and processing, a synchronizer ring having the same general size as that of the Example 3 was prepared.

EXPERIMENTAL EXAMPLE

As an experimental example, a comparison between the integrated synchronizer ring formed according to examples 1–3 and the conventional synchronizer ring formed according to the comparative example is illustrated. Specifically, the Pin-On-Disc friction wear tests were performed on the synchronizer ring prepared from the Example 3 and Comparative example, respectively. The test conditions were as follows:

Load: 20 lb;

Number of rotations: 1000 rpm/100,000 cycles;

Oil lubricant: W75; and

Temperature: 80° C.

The friction wear test showed that in case of two products prepared from Example 3 and Comparative example, abrasions were found in the range of 0.12–0.14 and 0.08–10, respectively.

According to this invention, the synchronizer ring having double structures has a number of practical advantages over the conventional one having a single structure in terms of raw materials, in that as revealed in the above test, the friction coefficient was greatly improved (about 45% up), in spite of using the inexpensive raw materials.

Other embodiments of the invention will be apparent to those skilled in the art from consideration of the specification and practice of the invention disclosed herein. It is intended that the specification and examples be considered as exemplary only. Thus, it should be understood that the invention is not limited to the illustrative examples in this specification. Rather, the invention is intended to cover all modifications and variations that come within the scope of the following claims and their equivalents.

What is claimed is:

1. A process for manufacturing a double-structure synchronizer ring in an integrated form and assembled for use in an automobile gear, comprising:

preparing an external ring body portion by press-molding and sintering an iron-based sintering metal material powder;

preparing an inter-diameter indentation portion by spraying a copper powder on a cold-indented steel sheet and press-molding and sintering the cold-indented steel sheet; and then inserting the inter-diameter indentation portion into the inter-diameter of the external ring body portion.

2. The process for manufacturing a synchronizer ring as set forth in claim 1, wherein said iron-based sintering metal material powder contains iron as main ingredient, together with other ingredients comprising 0.3~0.6 weight % of carbon, 1.0~3.0 weight % of copper, 1.0~5.0 weight % of nickel and 0.3~0.8 weight % of molybdenum.

3. The process for manufacturing a synchronizer ring as set forth in claim 1, wherein said press molding is performed at 6~7 ton/cm$^2$.

4. The process for manufacturing a synchronizer ring as set forth in claim 1, wherein the sintering of said external ring body portion is performed at 1140±20° C. for 30 mins to 1 hr.

5. The process for manufacturing a synchronizer ring as set forth in claim 1, wherein said copper powder is sprayed in a thickness of 0.5~1.0 mm for sintering.

6. The process for manufacturing a synchronizer ring as set forth in claim 1, wherein the sintering of said inter-diameter indentation portion is performed at 800±20° C. for 15 to 30 mins.

7. The process for manufacturing a double-structure synchronizer ring as set forth in claim 1, wherein:

the step of preparing the external ring body portion further comprises providing at least one junction hole at an inside of the external ring body portion;

the step of preparing an inter-diameter indentation portion further comprises providing at least one junction jaw at an outside surface of the inter-diameter indentation portion; and the step of indenting further comprises inserting a respective junction jaw into an associated junction hole.

8. The process for manufacturing a double-structure synchronizer ring as set forth in claim 1, wherein said copper powder is sprayed so as to provide a synchronizer ring with a mean friction coefficient value greater than $0.12\mu$.

9. The process for manufacturing a double-structure synchronizer ring as set forth in claim 1, wherein said copper powder is sprayed so as to provide a synchronizer ring with a mean friction coefficient range of between $0.12\mu$ and $0.14\mu$.

10. The process for manufacturing a double-structure synchronizer ring as set forth in claim 1, wherein said copper powder is sprayed so as to provide a synchronizer ring with a mean friction coefficient value of $0.13\mu$.

11. The process of manufacturing a double-structure synchronizer ring as set forth in claim 1, wherein the inter-diameter indentation portion is prepared by spraying the copper powder on the cold-indented steel sheet before press-molding and sintering the cold-indented steel sheet.

* * * * *